US012560839B2

(12) United States Patent
Yang et al.

(10) Patent No.: US 12,560,839 B2
(45) Date of Patent: Feb. 24, 2026

(54) DISPLAY DEVICE AND DISPLAY PANEL

(71) Applicants:YUNNAN INVENSIGHT OPTOELECTRONICS TECHNOLOGY CO., LTD., Yunnan (CN); BOE TECHNOLOGY GROUP CO., LTD., Beijing (CN)

(72) Inventors: Zongshun Yang, Beijing (CN); Qingshan Shan, Beijing (CN); Chao Yang, Beijing (CN); Weiliang Bu, Beijing (CN); Dacheng Zhang, Beijing (CN); Haojie Yuan, Beijing (CN); Shuanghong Wu, Beijing (CN); Han Wang, Beijing (CN)

(73) Assignees: YUNNAN INVENSIGHT OPTOELECTRONICS TECHNOLOGY CO., LTD., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 18/702,788

(22) PCT Filed: Mar. 29, 2023

(86) PCT No.: PCT/CN2023/084845
§ 371 (c)(1),
(2) Date: Apr. 18, 2024

(87) PCT Pub. No.: WO2024/197661
PCT Pub. Date: Oct. 3, 2024

(65) Prior Publication Data
US 2025/0231437 A1     Jul. 17, 2025

(51) Int. Cl.
*G02F 1/1335* (2006.01)
*G02F 1/13357* (2006.01)

(52) U.S. Cl.
CPC .. *G02F 1/133607* (2021.01); *G02F 1/133612* (2021.01); *G02F 1/133621* (2013.01)

(58) Field of Classification Search
CPC ......... G02F 1/133607; G02F 1/133612; G02F 1/133621
See application file for complete search history.

(56) References Cited

U.S. PATENT DOCUMENTS 11,372,232 B2 * 6/2022 Fang ...................... G02B 26/02
2008/0100773 A1 * 5/2008 Hwang ............. G02F 1/133606
362/361

(Continued)

FOREIGN PATENT DOCUMENTS

CN         101097846 A      1/2008
CN         102550126 A      7/2012

(Continued)

OTHER PUBLICATIONS

International Search Report from from PCT Application Serial No. PCT/CN2023/084845, dated Dec. 27, 2023, 5 pages.

*Primary Examiner* — Mary Ellen Bowman
(74) *Attorney, Agent, or Firm* — Kinney & Lange, P.A.

(57)        ABSTRACT
A display device and a display panel are provided. The display device includes a base substrate, at least one light-emitting unit on the base substrate, an encapsulation layer covering the at least one light-emitting unit, and at least one lens on a side of the encapsulation layer away from the base substrate. The light-emitting unit has a first electrode, a second electrode, and a light-emitting layer located between the first electrode and the second electrode. The first electrode is located between the light-emitting layer and the base substrate. The at least one lens corresponds one-to-one with the at least one light-emitting unit. The lens has a first part and a second part surrounding the first part. An outer surface of the first part has a first curvature, an outer surface of the (Continued)

second part has a second curvature, and the first curvature is less than the second curvature.

19 Claims, 9 Drawing Sheets

(56)                    References Cited

U.S. PATENT DOCUMENTS

| | | | |
|---|---|---|---|
| 2008/0278655 A1* | 11/2008 | Moon | G02F 1/133609 |
| | | | 362/307 |
| 2022/0158135 A1* | 5/2022 | Irobe | H10H 20/855 |

FOREIGN PATENT DOCUMENTS

| | | | |
|---|---|---|---|
| CN | 114551524 | A | 5/2022 |
| CN | 112054131 | B | 9/2022 |
| CN | 115867085 | A | 3/2023 |
| JP | H10223367 | A | 8/1998 |
| JP | 2000183321 | A | 6/2000 |
| JP | 2013120731 | A | 6/2013 |
| JP | 2015015281 | A | 1/2015 |

* cited by examiner

207

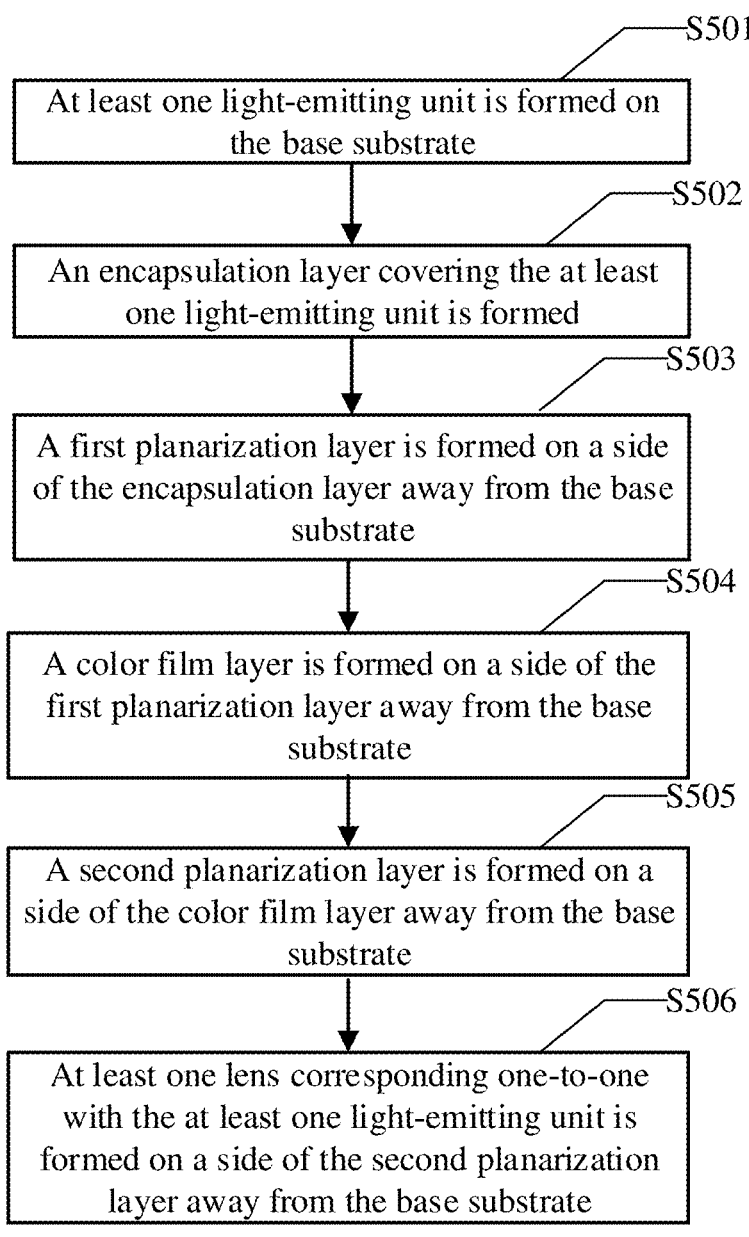

S501

At least one light-emitting unit is formed on the base substrate

S502

An encapsulation layer covering the at least one light-emitting unit is formed

S503

A first planarization layer is formed on a side of the encapsulation layer away from the base substrate

S504

A color film layer is formed on a side of the first planarization layer away from the base substrate

S505

A second planarization layer is formed on a side of the color film layer away from the base substrate

S506

At least one lens corresponding one-to-one with the at least one light-emitting unit is formed on a side of the second planarization layer away from the base substrate

DISPLAY DEVICE AND DISPLAY PANEL

CROSS REFERENCE TO RELATED APPLICATION(S)

This application is a Section 371 National Stage Application of International Application No. PCT/CN2023/084845, filed on Mar. 29, 2023, entitled "DISPLAY DEVICE AND DISPLAY PANEL", which is incorporated herein by reference in its entirety.

TECHNICAL FIELD

The present disclosure relates to a field of display technology, and in particular, to a display device and a display panel.

BACKGROUND

A light-emitting device is an important light-emitting unit in a micro display. Among indicator parameters for evaluating the micro display, a brightness of the light-emitting device may be an important measurement indicator. In order to improve display brightness, a lens process may be added to the light-emitting device to achieve a goal of improving brightness through focusing light. However, in the lens process, while improving device brightness, there is often a certain loss of viewing angle.

SUMMARY

The present disclosure provides a display device and a display panel.

An aspect of the present disclosure provides a display device. The display device includes: a base substrate; at least one light-emitting unit on the base substrate; an encapsulation layer covering the at least one light-emitting unit; a first planarization layer on a side of the encapsulation layer away from the base substrate; a color film layer on a side of the first planarization layer away from the base substrate; a second planarization layer on a side of the color film layer away from the base substrate; and at least one lens on a side of the second planarization layer away from the base substrate, wherein the at least one lens corresponds one-to-one with the at least one light-emitting unit, wherein the lens has a first part and a second part surrounding the first part, an outer surface of the first part has a first curvature, an outer surface of the second part has a second curvature, and the first curvature is less than the second curvature.

For example, a projection of the first part on the base substrate is located within a projection of a bottom surface of the lens on the base substrate, and a projection of the second part on the base substrate is located outside the projection of the bottom surface of the lens on the base substrate.

For example, the lens has a first dimension in a direction parallel to the base substrate and a second dimension in a direction perpendicular to the base substrate, and a ratio of the first dimension to the second dimension is within a range of 1.5 to 2.

For example, a dimension of the lens in the direction parallel to the base substrate is within a range of 2200 nm to 2600 nm, and a dimension of the lens in the direction perpendicular to the base substrate is within a range of 1200 nm to 1500 nm.

For example, a surface inclination of the first part of the lens is within a range of 25 degrees to 35 degrees, and a surface inclination of the second part of the lens is within a range of 85 degrees to 95 degrees, so that the first curvature is less than the second curvature, and wherein the surface inclination of the first part is an angle of a surface tangent of the first part at a half height of the first part in a direction perpendicular to the base substrate relative to a first direction, the surface inclination of the second part is an angle of a surface tangent of the second part at a half height of the second part in the direction perpendicular to the base substrate relative to the first direction, and the first direction is parallel to the base substrate.

For example, at a position where the second part is in contact with the second planarization layer, an angle between the outer surface of the second part and an outer surface of the second planarization layer is within a range of 43 degrees to 47 degrees.

For example, a surface of the second planarization layer covered by the lens is higher than a surface of the second planarization layer not covered by the lens in a direction perpendicular to and away from the base substrate, so that a bump is formed in a region in which the second planarization layer is not covered by the lens.

For example, the lens has a first projection on the base substrate, a bottom surface of the lens has a second projection on the base substrate, and a distance between an outer edge of the first projection and an outer edge of the second projection is greater than a height of the bump.

For example, the display device includes a plurality of light-emitting units and a plurality of lenses corresponding one-to-one with the plurality of light-emitting units, a minimum distance between adjacent lenses is within a range of 450 nm to 600 nm, and a minimum distance between outer edges of bottom surfaces of adjacent lenses is within a range of 680 nm to 840 nm.

For example, the color film layer includes a first color film, a second color film, and a third color film; the plurality of light-emitting units include a first light-emitting unit located on a side of the first color film facing the base substrate, a second light-emitting unit located on a side of the second color film facing the base substrate, and a third light-emitting unit located on a side of the third color film facing the base substrate; the plurality of lenses include a first lens located on a side of the first color film away from the base substrate, a second lens located on a side of the second color film away from the base substrate, and a third lens located on a side of the third color film away from the base substrate; wherein the first color film is formed after forming the second color film and the third color film, and the first color film is adjacent to one of the second color film and the third color film and covers a part of the one of the second color film and the third color film; and wherein a minimum distance between the first lens and one of the second lens and the third lens adjacent to the first lens is less than a minimum distance between adjacent second and third lenses.

For example, the minimum distance between the first lens and one of the second lens and the third lens adjacent to the first lens is within a range of 535 nm to 545 nm, and the minimum distance between adjacent second and third lenses is within a range of 545 nm to 555 nm.

For example, the first color film is adjacent to the second color film and covers a part of the second color film, and the third color film is adjacent to the second color film and covers a part of the second color film; and a thickness of a first overlapping part in a direction perpendicular to the base substrate is greater than a thickness of a second overlapping part in the direction perpendicular to the base substrate, the first overlapping part is a part of the first color film that covers the second color film, and the second overlapping part is a part of the third color film that covers the second color film.

For example, each of the at least one lens has a first projection on the base substrate and a bottom surface of the lens has a second projection on the base substrate; and a distance between an outer edge of the first projection and an outer edge of the second projection of each lens is less than the thickness of the first overlapping part of the first color film in the direction perpendicular to the base substrate.

For example, a distance between outer edges of the first projection and the second projection of the first lens is greater than a distance between outer edges of the first projection and the second projection of each of the second lens and the third lens.

For example, a surface inclination of the first part of the first lens is less than a surface inclination of the first part of one of the second lens and the third lens, and the surface inclination of the first part is an angle of a surface tangent of the first part at a half height of the first part in a direction perpendicular to the base substrate relative to a first direction.

For example, a first bump is formed in a region of the second planarization layer between the first lens and the second lens and not covered by the first lens and the second lens, a second bump is formed in a region of the second planarization layer between the second lens and the third lens and not covered by the second lens and the third lens, and the first bump is higher than the second bump in the direction perpendicular to the base substrate and away from the base substrate.

For example, a curvature of the first bump is greater than the first curvature and less than the second curvature.

For example, a curvature of the first bump is greater than a curvature of a surface of the first overlapping part on a side of the first overlapping part away from the base substrate.

For example, a curvature of the second bump is less than a curvature of a surface of the second overlapping part on a side of the second overlapping part away from the base substrate.

For example, the first color film is a green color film; one of the second color film and the third color film is a red color film, and the other of the second color film and the third color film is a blue color film.

For example, the light-emitting unit has a first electrode, a second electrode, and a light-emitting layer between the first electrode and the second electrode, and the first electrode is located between the light-emitting layer and the base substrate.

For example, the display device further includes a pixel defining layer between the base substrate and the light-emitting layer, wherein the pixel defining layer covers an edge of an anode of the light-emitting unit.

Embodiments of the present disclosure further provide a display panel including the display device as described above.

BRIEF DESCRIPTION OF THE DRAWINGS

Other objects and advantages of the present disclosure will become clear through following description on the present disclosure with reference to accompanying drawings, and in the drawings:

FIG. 5 shows a flowchart of a method of manufacturing a display device according to embodiments of the present disclosure;

Figure 1:
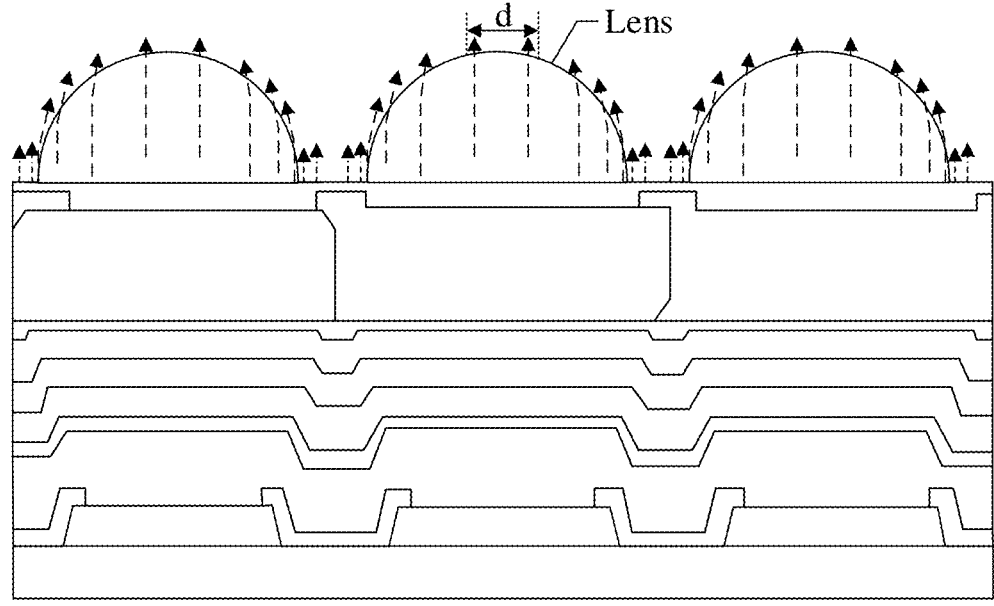
FIG. 1 shows a schematic cross-sectional view of a display device.

It should be noted that for clarity, the dimensions of layers, structures, or regions may be enlarged or reduced in the drawings used to describe embodiments of the present disclosure, that is, these drawings are not drawn to actual scales.

DETAILED DESCRIPTION OF EMBODIMENTS

In order to make the purposes, technical solutions, and advantages of embodiments of the present disclosure clearer, the following will provide a clear and complete description of the technical solution of embodiments of the present disclosure in conjunction with accompanying drawings of embodiments of the present disclosure. Clearly, the described embodiments are a part of embodiments of the present disclosure, rather than the entire embodiments. Based on the described embodiments of the present disclosure, all other embodiments obtained by those ordinary skilled in the art without the need for creative labor fall within the scope of protection of the present disclosure.

It should be noted that in the accompanying drawings, for clarity and/or descriptive purposes, the dimensions and relative dimensions of the elements may be enlarged. In this way, the dimensions and relative dimensions of each element need not be limited to the dimensions and relative dimensions shown in the figures. In the specification and drawings, the same or similar reference signs indicate the same or similar components.

Unless otherwise defined, technical or scientific terms used in the present disclosure shall have the usual meaning understood by those ordinary skilled in the art. The terms "first", "second", and similar terms used in the present disclosure do not represent any order, quantity, or importance, but are only used to distinguish different components. Words such as "including" or "containing" refer to elements or objects that appear before the words include elements or objects and their equivalents listed after the words, without excluding other elements or objects.

In the present disclosure, unless otherwise specified, directional terms such as "up", "down", "left", "right", "inside", "outside" are used to represent orientation or positional relationships shown based on the accompanying drawings, only for the purpose of describing the present disclosure, and not to indicate or imply that the referred device, element or component must have a specific orientation, be constructed or operated in a specific orientation. It should be understood that when the absolute positions of the described objects change, the relative positional relationship of these objects may also change accordingly. Therefore, these directional terms cannot be understood as limitations to the present disclosure.

It should be noted that in the present disclosure, the term "same layer" refers to a layer structure formed by using a same film-forming process to form a film layer with a specific pattern, followed by patterning the film layer through a single patterning process using a same mask. Depending on a specific shape, the single patterning process may include multiple exposure, development, or etching processes, and the specific shape in the formed layer structure may be continuous or discontinuous. That is, a plurality of elements, components, structures, and/or parts located in the "same layer" include a same material and are formed through the same patterning process. Generally, the plurality of elements, components, structures, and/or parts located in the "same layer" have substantially equal thicknesses.

Those skilled in the art should understand that in the present disclosure, unless otherwise specified, the term "height" or "thickness" refers to the dimension of the surface of the film layer provided perpendicular to the display substrate, that is, the dimension in the light exit direction of the display substrate, or the dimension in the normal direction of the display device.

In the present disclosure, directional expressions such as "first direction" and "second direction" are used to describe different directions along pixel units, such as the vertical and horizontal directions of pixel units, or the row and column directions of arranged sub-pixels. It should be understood that such representation is only an illustrative description and not a limitation to the present disclosure.

FIG. 1 shows a schematic diagram of a display device. In general, an addition of a lens process may cause a brightness of the display device to increase by 1.2 times to 1.8 times. As shown in FIG. 1, curvatures of lenses are substantially equal, and these lenses are relatively steep. Light at an edge of the lens does not pass through the lens, and a range of a highest brightness region is d. The lens process causes scattered light around a pixel to sharply converge towards a center of the pixel, resulting in a narrower viewing angle, and therefore, while using the lens to increase the brightness of the device, there is often a certain loss of viewing angle. A spacing between the lenses is limited by an exposure limit (e.g. about 0.6 μm to 0.8 μm) of the apparatus. A part of light in a space between the lenses may not effectively pass through the lenses, resulting in the inability to achieve maximum gain (for example, a lens gain may only reach 1.4 times to 1.5 times).

In view of this, embodiments of the present disclosure provide a flat lens. By adjusting a hot melting process of the lens based on the exposure limit (0.6 μm to 0.8 μm) of the apparatus, the space between the lenses is further reduced to minimize the scattered light around the pixel, thereby further improving a light efficiency and increasing the brightness. In addition, a coverage range of brightness in a central region may be controlled and widened, which may increase a brightness viewing angle of a product while increasing the brightness of the device.

Specifically, the display device provided by embodiments of the present disclosure includes: a base substrate; at least one light-emitting unit located on the base substrate; an encapsulation layer covering the at least one light-emitting unit; a first planarization layer located on a side of the encapsulation layer away from the base substrate; a color film layer located on a side of the first planarization layer away from the base substrate; a second planarization layer located on a side of the color film layer away from the base substrate; and at least one lens located on a side of the second planarization layer away from the base substrate, and corresponding one-to-one with the at least one light-emitting unit. The lens has a first part and a second part surrounding the first part, an outer surface of the first part has a first curvature, an outer surface of the second part has a second curvature, and the first curvature is less than the second curvature.

Figure 2A:
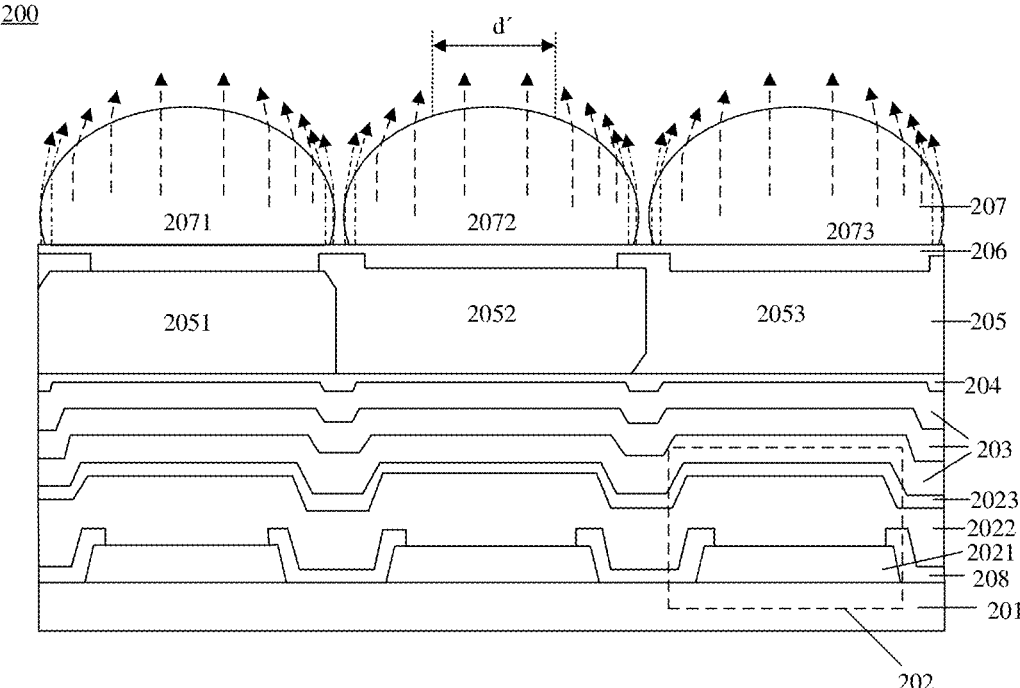
FIG. 2A shows a schematic cross-sectional view of a display device according to embodiments of the present disclosure.
Figure 2B:
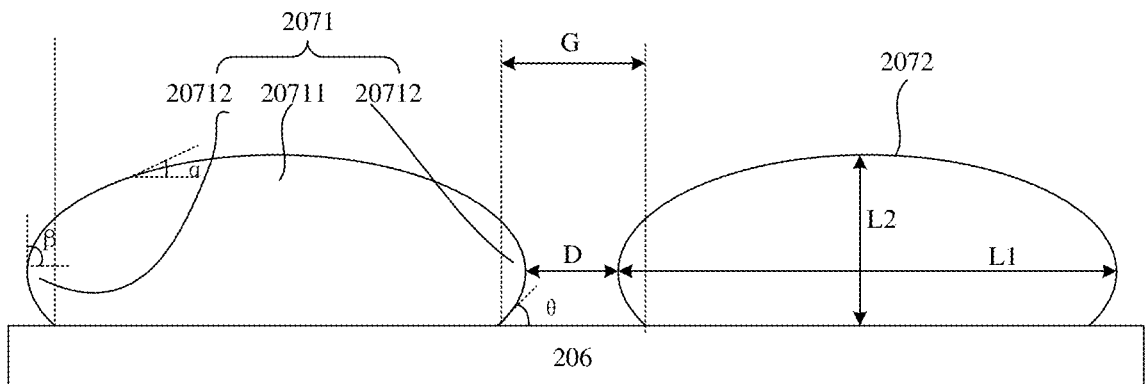
FIG. 2B shows a partial enlarged view of the display device shown in FIG. 2A.

FIG. 2A shows a schematic cross-sectional view of a display device according to embodiments of the present disclosure. FIG. 2B shows a schematic cross-sectional view of a partial structure of the display device shown in FIG. 2A.

As shown in FIGS. 2A and 2B, the display device 200 may include a base substrate 201, at least one light-emitting unit 202, an encapsulation layer 203, a first planarization layer 204, a color film layer 205, a second planarization layer 206, and at least one lens 207. In some embodiments, the base substrate 201 may be formed using a single crystal silicon wafer.

At least one light-emitting unit 202 is located on the base substrate 201. The encapsulation layer 203 covers at least one light-emitting unit 202. The first planarization layer 204 is located on a side of the encapsulation layer 203 away from the base substrate 201. The color film layer 205 is located on a side of the first planarization layer 204 away from the base substrate 201. The second planarization layer 206 is located on a side of the color film layer 205 away from the base substrate 201. At least one lens 207 is located on a side of the second planarization layer 206 away from the base substrate 201, and corresponds one-to-one with at least one light-emitting unit 202. According to embodiments of the present disclosure, the light-emitting unit 202 may have a first electrode 2021, a second electrode 2023, and a light-emitting layer 2022 located between the first electrode 2021 and the second electrode 2023. The first electrode 2021 may be located between the light-emitting layer 2022 and the base substrate 201, the first electrode 2021 may serve as an anode, and the second electrode 2023 may serve as a cathode. The anode may provide holes, the cathode may provide electrons, and the holes and the electrons may combine in the light-emitting layer to form excitons. Excitons excite the light-emitting layer to emit light, thereby achieving the luminescence of the display device. According to embodiments of the present disclosure, a pixel defining layer 208 may be further provided between the base substrate 201 and the light-emitting layer 2022. The pixel defining layer 208 covers an edge of the anode of each light-emitting unit 202. The pixel defining layer 208 is used to define a plurality of light-emitting units 202 in the display device.

As shown in FIGS. 2A and 2B, at least one lens 207 described above may include a first lens 2071, a second lens 2072, and a third lens 2073. Each lens 207 may have a first part and a second part surrounding the first part. An outer surface of the first part has a first curvature, an outer surface of the second part has a second curvature, and the first curvature is less than the second curvature. Taking the first lens 2071 as an example, the first lens 2071 has a first part 20711 and a second part 20712 surrounding the first part 20711. An outer surface of the first part 20711 (i.e. a top surface of the lens) has a first curvature, an outer surface of the second part 20712 (i.e. a side surface of the lens) has a second curvature, and the first curvature is less than the second curvature. The division of the first part and the second part of the lens may be determined by a projection of a bottom surface of the lens on the base substrate 201. For example, taking the first lens 2071 as an example, a projection of the first part 20711 of the lens 2071 on the base substrate 201 may be located within a projection of a bottom surface of the lens 2071 on the base substrate 201, and a projection of the second part 20712 of the lens 2071 on the base substrate 201 may be located outside the projection of the bottom surface of the lens 2071 on the base substrate 201. For example, a cross-section of the lens may have a shape similar to that obtained by cutting off a bottom of an ellipse along a major axis of the ellipse. As shown in FIG. 2B, the lens has a first dimension L1 in a direction parallel to the base substrate 201 and a second dimension L2 in a direction perpendicular to the base substrate 201. A ratio of the first dimension L1 to the second dimension L2 may be within a range of 1.5 to 2. For example, the first dimension L1 may be within a range of 2200 nm to 2600 nm, such as 2460 nm to 2470 nm. The second dimension L2 may be within a range of 1200 nm to 1500 nm, such as 1330 nm to 1340 nm. According to embodiments of the present disclosure, a relatively flat lens is achieved by setting the first curvature to be less than the second curvature, with a smaller spacing between the lenses (e.g., may be within a range of 0.2 μm to 0.5 μm), the light passing through the space between the lenses may be maximally converged, thereby maximizing the lens gain (which may reach 1.6 times to 1.8 times) and further increasing the brightness of the display device.

In some embodiments, a surface inclination of the first part of the lens is within a range of 25 degrees to 35 degrees, and a surface inclination of the second part of the lens is within a range of 85 degrees to 95 degrees, so that the first curvature is less than the second curvature. The surface inclination of the first part here refers to an angle of a surface tangent of the first part at a half height of the first part in the direction perpendicular to the base substrate relative to a first direction. The surface inclination of the second part refers to an angle of a surface tangent of the second part at a half height of the second part in the direction perpendicular to the base substrate relative to the first direction. The first direction is parallel to the base substrate. Taking the first lens 2071 as an example, an angle α of a surface tangent of the first part 20711 of the first lens 2071 at a half height of the first part 20711 in the direction perpendicular to the base substrate relative the first direction is within a range of 25 degrees to 35 degrees. An angle β of a surface tangent of the second part 20712 of the first lens 2071 at a half height of the second part 20712 in the direction perpendicular to the base substrate relative to the first direction is within a range of 85 to 95 degrees, for example, about 90 degrees. In some embodiments, at a position where the second part is in contact with the second planarization layer 206, an angle θ between an outer surface of the second part (such as the second part 20712 shown in FIG. 2B) and an outer surface of the second planarization layer 206 is within a range of 43 degrees to 47 degrees, for example, about 45 degrees. The structural parameters of the second lens 2072 and the third lens 2073 also comply with the above description, and will not be repeated here.

In some embodiments, as shown in FIGS. 2A and 2B, the display device 200 may include: a plurality of light-emitting units 202, such as a first light-emitting unit 2024, a second light-emitting unit 2025, and a third light-emitting unit 2026; and a plurality of lenses 207 corresponding one-to-one with the plurality of light-emitting units 202, such as, the first lens 2071, the second lens 2072, and the third lens 2073 corresponding one-to-one with the light-emitting units described above. A minimum distance D between adjacent lenses may be within a range of 450 nm to 600 nm, and a minimum distance G between outer edges of bottom surfaces of adjacent lenses may be within a range of 680 nm to 840 nm.

The color film layer 205 may include a first color film 2051, a second color film 2052, and a third color film 2053. The plurality of light-emitting units 202 may include the first light-emitting unit 2024, the second light-emitting unit 2025, and the third light-emitting unit 2026 located on a side of the first color film 2051, the second color film 2052, and the third color film 2053 facing the base substrate 201, respectively. The plurality of lenses 207 may include the first lens 2071, the second lens 2072, and the third lens 2073 located on a side of the first color film 2051, the second color film 2052, and the third color film 2053 away from the base substrate 201, respectively. The first color film 2051 may be formed after forming the second color film 2052 and the third color film 2053. The first color film 2051 is adjacent to one of the second color film 2052 and the third color film 2053 and covers a part of one of the second color film 2052 and the third color film 2053. According to embodiments of the present disclosure, the first color film 2051 may be a green color film. One of the second color film 2052 and the third color film 2053 may be a red color film, and the other of the second color film 2052 and the third color film 2053 may be a blue color film. The green color film, red color film, and blue color film may be used to cause the display device to emit green light, red light, and blue light, respectively. According to embodiments of the present disclosure, a main material composition structure of the color film layer 205 includes a glass substrate, a black matrix BM, a color layer RGB, a protective layer OC, an ITO conductive film, a columnar spacer (Spacer), etc. The composition structure of the color film layer 205 may vary slightly depending on a display mode. For example, an RGB arrangement of a color layer may be divided into bar arrangement, point arrangement, triangle arrangement, mosaic arrangement, or other specific pattern arrangement (such as similar portrait or animal patterns). Bar and dot arrangements are generally used for large-sized and high-precision products. Triangle and mosaic arrangements are generally used for small-sized and low-precision products. Chromaticity and transmittance are the two major optical properties of the color film layer, which mainly depend on the RGB material of the color layer.

Figure 3:
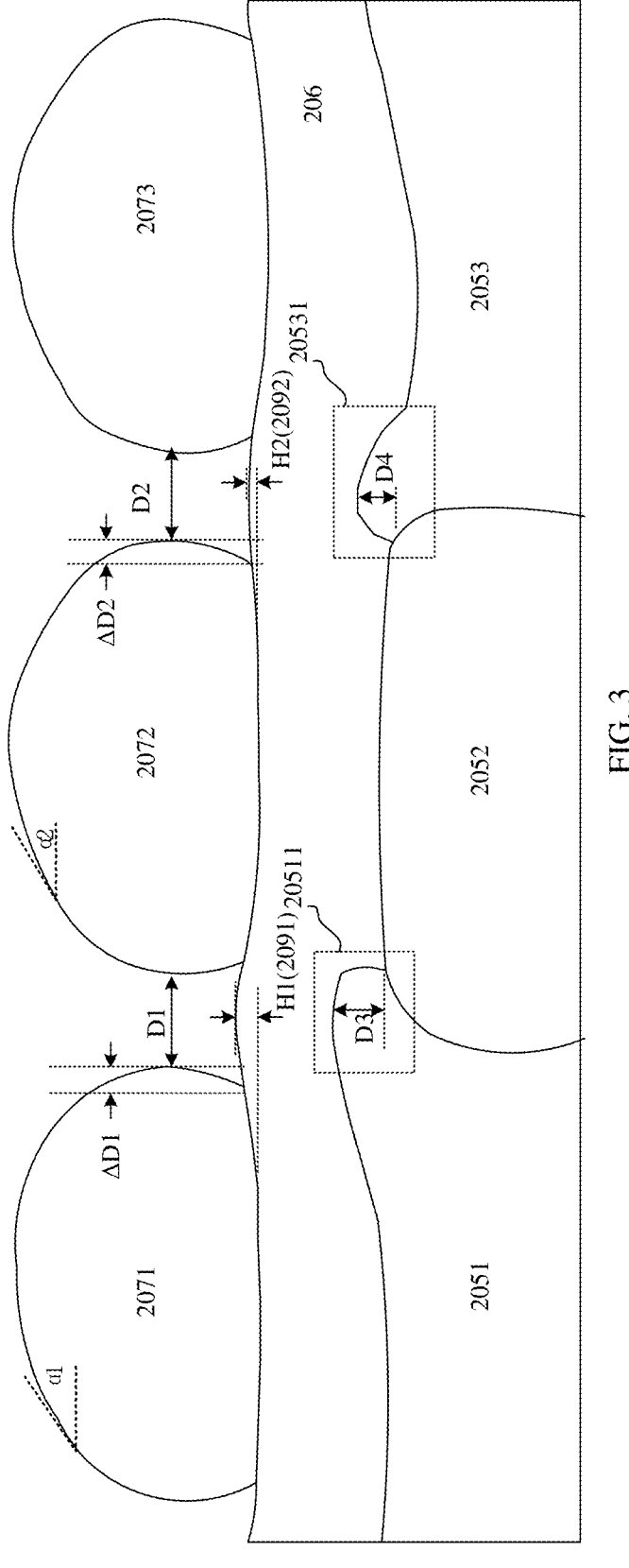
FIG. 3 shows a partial enlarged view of a cross-section of a display device according to embodiments of the present disclosure.

FIG. 3 shows a partial enlarged view of a cross-section of a display device according to embodiments of the present disclosure.

As shown in FIG. 3, the color film layer may include a first color film 2051, a second color film 2052, and a third color film 2054, which are respectively provided on a side of the three light-emitting units away from the base substrate, so that the light emitted by the three light-emitting units passes through the color films to have different colors. The first lens 2071, the second lens 2072, and the third lens 2073 are provided on a side of the first color film 2051, the second color film 2052, and the third color film 2054 away from the base substrate, respectively, so as to converge the light emitted by the first to third light-emitting units and transmitted through the respective color films. In some embodiments, the first color film 2051, the second color film 2052, and the third color film 2053 may be formed sequentially, and the subsequently formed color film may cover a part of the previously formed color film. For example, the first color film 2051 may be the last formed color film, which may cover a part of the second color film 2052 or the third color film 2053 adjacent to the first color film 2051, such as covering a part of the adjacent second color film 2052 as shown in FIG. 3. One of the second color film 2052 and the third color film 2053 may cover a part of the other of the second color film 2052 and the third color film 2053, for example, as shown in FIG. 3, the third color film 2053 covers a part of the second color film 2052. A part of the first color film 2051 that covers one of the second color film 2052 and the third color film 2053 (the part of the first color film 2051 that covers the second color film 2052 as shown in FIG. 3) may be referred to as a first overlapping part 20511, and a part of the third color film 2053 that covers the second color film 2052 may be referred to as a second overlapping part 20531. The first color film 2051 may be a green color film, one of the second color film 2052 and the third color film 2053 may be a red color film, and the other of the second color film 2052 and the third color film 2053 may be a blue color film. In some embodiments, a thickness D3 of the first overlapping part 20511 in the direction perpendicular to the base substrate 201 is greater than a thickness D4 of the second overlapping part 20531 in the direction perpendicular to the base substrate 201.

As shown in FIG. 3, in the direction perpendicular to and away from the base substrate, a surface of the second planarization layer 206 covered by the lenses 2071, 2072, and 2073 is higher than a surface of the second planarization layer 206 not covered by the lenses 2071, 2072, and 2073, so that a bump is formed in a region in which the second planarization layer 206 is not covered by the lenses. According to embodiments of the present disclosure, a first bump 2091 is formed in a region of the second planarization layer 206 between the first lens 2071 and the second lens 2072 and not covered by the first lens 2071 and the second lens 2072, a second bump 2092 is formed in a region of the second planarization layer 206 between the second lens 2072 and the third lens 2073 and not covered by the second lens 2072 and the third lens 2073. The first bump 2091 is higher than the second bump 2092 in the direction perpendicular to the base substrate 201 and away from the base substrate 201. For example, a height H1 of the first bump 2091 may be greater than a height H2 of the second bump 2092. The height of the bump here is defined by a distance between the surface of the second planarization layer 206 not covered by the lens and the surface of the second planarization layer 206 covered by the lens. For example, as shown in FIG. 3, the height H1 of the first bump 2091 is a height of an upper surface of the first bump 2091 relative to the surface of the second planarization layer 206 covered by the lenses 2071, 2072, and 2073; the height H2 of the second bump 2092 is a height of an upper surface of the second bump 2092 relative to the surface of the second planarization layer 206 covered by the lenses 2071, 2072, and 2073. According to embodiments of the present disclosure, a curvature of the first bump 2091 may be greater than the first curvature described above and less than the second curvature described above. According to embodiments of the present disclosure, the curvature of the first bump 2091 may be greater than a curvature of a surface of the first overlapping part 20511 on a side away from the base substrate 201. According to embodiments of the present disclosure, a curvature of the second bump 2092 is less than a curvature of a surface of the second overlapping part 20531 on a side away from the base substrate 201.

In some embodiments, as shown in FIG. 3, a minimum distance D1 between the first lens 2071 located above the first color film 2051 and the second or third lens adjacent to the first lens (the second lens 2072 as shown in FIG. 3) is less than a minimum distance D2 between the adjacent second lens 2072 and third lens 2073. In some embodiments, D1 the minimum distance between adjacent lenses may refer to a distance between two closest points on outer surfaces of adjacent lenses. For example, in the cross-sectional view of FIG. 3, each lens has two farthest points in the direction parallel to the base substrate, referred to as vertices. The minimum distance between adjacent lenses may refer to a distance between adjacent vertices of the two adjacent lenses. In some embodiments, the minimum distance D1 between the first lens 2071 and the second or third lens adjacent to the first lens (the second lens 2072 as shown in FIG. 3) is within a range of 535 nm to 545 nm, for example, 539 nm. The minimum distance D2 between adjacent second lens 2072 and third lens 2073 is within a range of 545 nm to 555 nm, for example, 548 nm.

According to embodiments of the present disclosure, the lens has a first projection on the base substrate, and the bottom surface of the lens has a second projection on the base substrate. A distance between an outer edge of the first projection and an outer edge of the second projection is greater than the height of the bump. For example, both a distance $\Delta D1$ between the outer edges of the first and second projections of the first lens 2071 and a distance $\Delta D2$ between the outer edges of the first and second projections of the second lens 2071 may be greater than the height of the first bump 2091 and the height of the second bump 2092, for example, greater than the higher height H1. In some embodiments, the distance $\Delta D1$ between the outer edges of the first and second projections of the first lens 2071 is greater than the distance $\Delta D2$ between the outer edges of the first and second projections of the second lens 2071.

In some embodiments, the surface inclination $\alpha 1$ of the first part of the first lens 2071 is less than the surface inclination $\alpha 2$ of the first part of the second lens 2072 or the third lens 2073.

In some embodiments, a distance between the first and second projections of the lens is less than the thickness of the overlapping part of the color film, for example, less than the thickness D3 of the thicker first overlapping part 20511. For example, both the distance $\Delta D1$ between the outer edges of the first and second projections of the first lens 2071 and the distance $\Delta D2$ between the outer edges of the first and second projections of each of the second lens 2072 and the third lens 2073 may be less than the thickness D3 of the first overlapping part 20511 of the first color film 2051 in the direction perpendicular to the base substrate 201.

According to embodiments of the present disclosure, in a process of white balance, the brightness requirement for the light (such as green) corresponding to the first color film is usually much greater than the brightness requirement for the light of other colors. Therefore, compared to the second and third color films, the crosstalk of the first color film is more severe. By setting the structure around the first color film to be different from that around the second and third color films, it is possible to reduce light crosstalk and optical color deviation. Embodiments of the present disclosure provide various methods to achieve that the structure around the first color film is different from the structure around the second and third color films. For example, the brightness of the light transmitted by the first color film is usually lower than the brightness of the light transmitted by the second and third color films. By setting D1 to be less than D2, the spacing between the lens above the first color film and an adjacent lens may be less than the spacing between adjacent lenses above other color films, resulting in less light leakage around the lens above the first color film and thus improving the brightness of the light transmitted by the first color film. By setting ΔD1 to be greater than ΔD2, a lateral extension distance of the lens above the first color film may be greater than lateral extension distances of the lenses above the second and third color films. This may cause the lens above the first color film to converge more light than the lenses above the second and third color films, which may also improve the brightness of the light transmitted by the first color film. By setting the height H1 of the first bump (located above the region between the first color film and the second or third color film) in the second planarization layer to be greater than the height H2 of the second bump (located above the region between the second and third color films) in the second planarization layer, the crosstalk of the light transmitted by the first color film to the light transmitted by the second and third color films may be reduced, thereby alleviating the crosstalk problem between adjacent sub-pixels.

Figure 4:
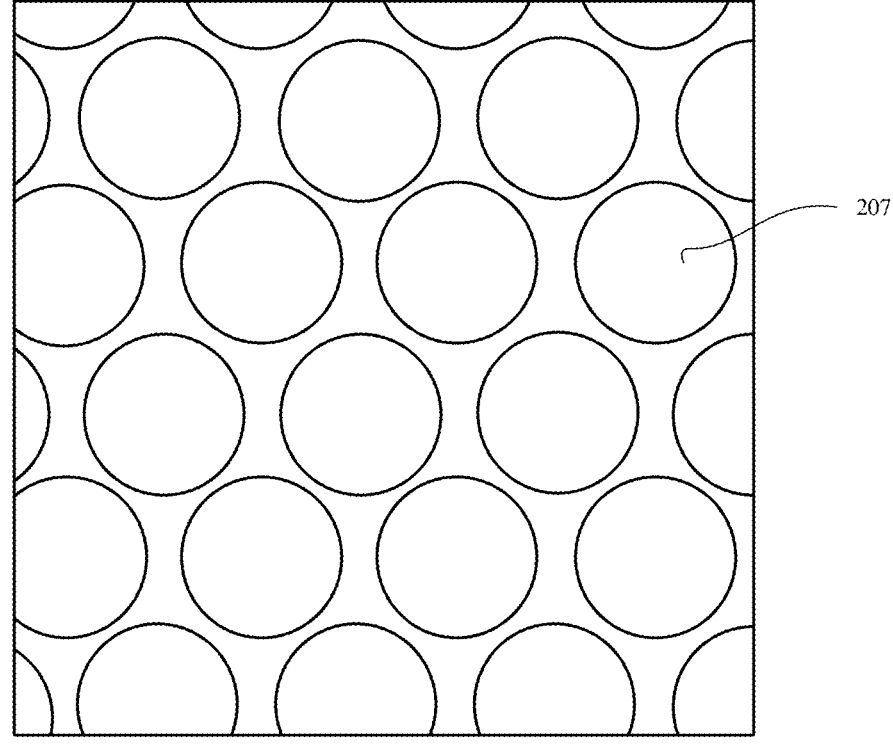
FIG. 4 shows a top view of a display device according to embodiments of the present disclosure.

FIG. 4 shows a top view of a display device according to embodiments of the present disclosure. As shown in FIG. 4, a projection of the lens on the base substrate may have a circular shape. However, embodiments of the present disclosure are not limited to this. The projection of the lens on the base substrate may have other shapes as desired, such as squares, regular polygons, rectangles, ellipses, and so on.

FIG. 5 shows a flowchart of a method of manufacturing a display device according to embodiments of the present disclosure. FIGS. 6A to 6E schematically show processes of manufacturing a display device according to embodiments of the present disclosure.

Figures 6A, 6B:
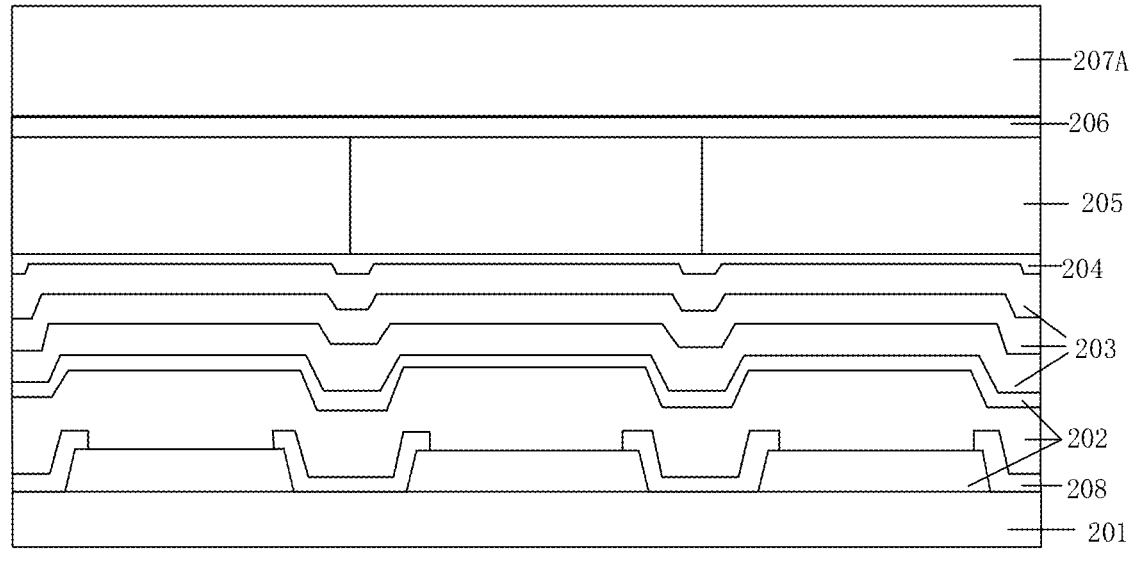
FIGS. 6A to 6E schematically show processes of manufacturing a display device according to embodiments of the present disclosure.
Figure 6C:
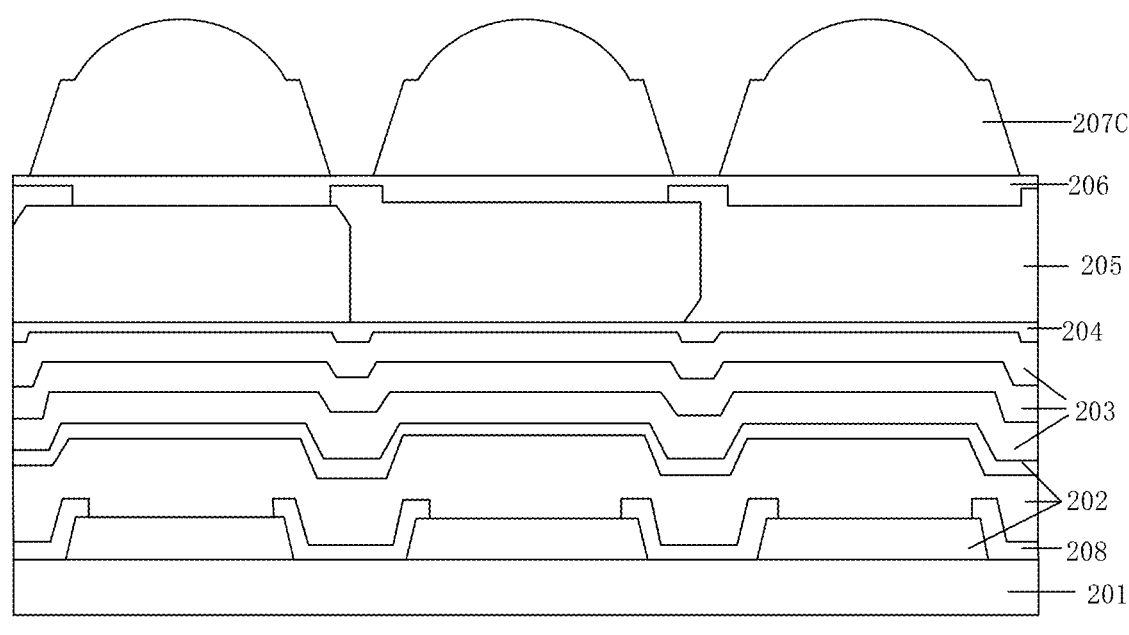
Figure 6D:
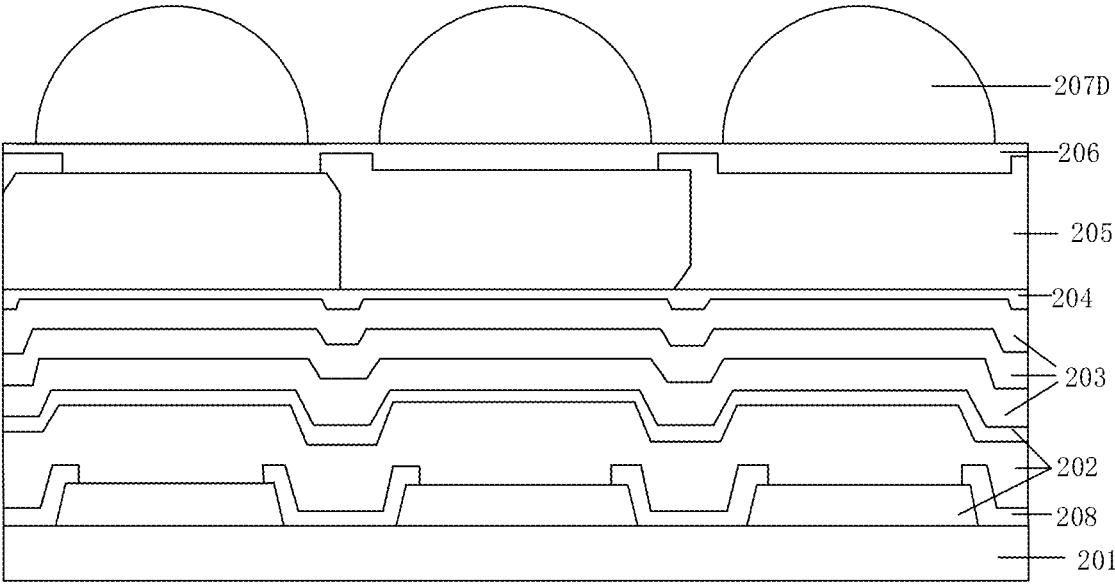
Figure 6E:
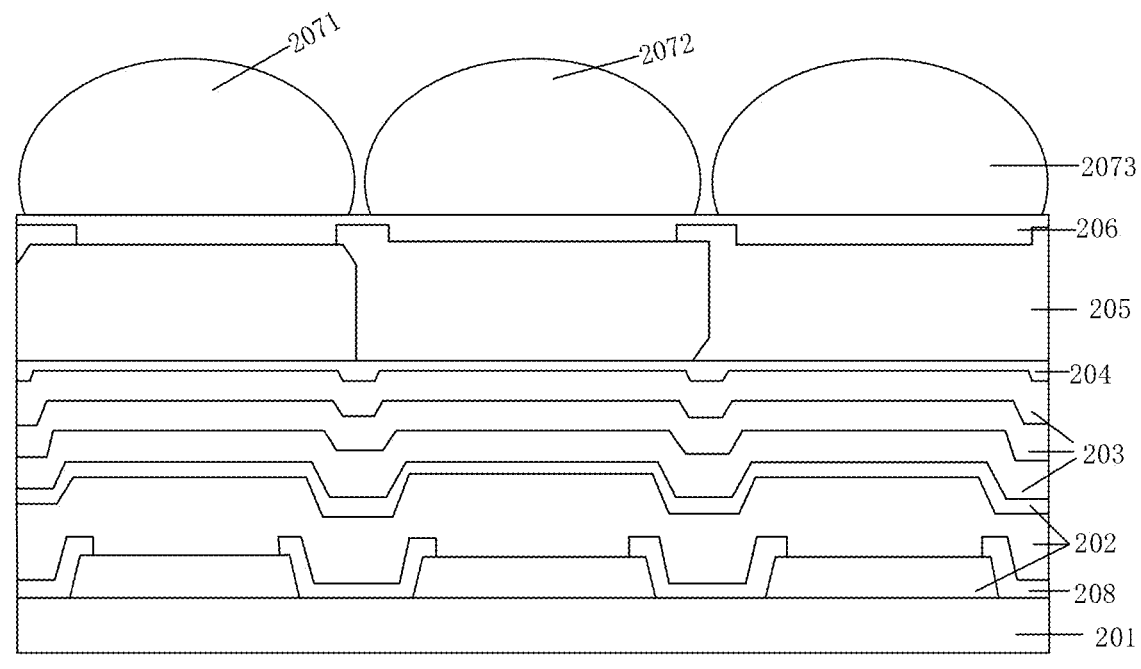

Referring to FIGS. 5 to 6E, the method of manufacturing the display device includes operations S501 to S506.

In operation S501, at least one light-emitting unit 202 is formed on the base substrate 201.

In operation S502, an encapsulation layer 203 covering the at least one light-emitting unit 202 is formed.

In operation S503, a first planarization layer 204 is formed on a side of the encapsulation layer 203 away from the base substrate.

In operation S504, a color film layer 205 is formed on a side of the first planarization layer 204 away from the base substrate.

In operation S505, a second planarization layer 206 is formed on a side of the color film layer away from the base substrate.

In operation S506, at least one lens 207 corresponding one-to-one with the at least one light-emitting unit 202 is formed on a side of the second planarization layer 206 away from the base substrate 201.

Referring to FIGS. 6A to 6E, forming at least one lens 207 may include the following operations.

A lens material 207A is coated on the second planarization layer 206 to obtain the structure shown in FIG. 6A. The material of the lens is generally an organic or inorganic material with a transmittance greater than 90% and a refractive index between 1.4 and 1.8, as long as the lens can form a smooth hemispherical shape. Then, the lens material 207A is patterned, such as through exposure, development, etc., to obtain at least one lens body 207B. The patterned structure may be shown in FIG. 6B. Then, at least one lens body 207B is shaped from the top of the lens body, and an intermediate structure 207C as shown in FIG. 6C and the shaped lens body 207D as shown in FIG. 6D are sequentially obtained. According to embodiments of the present disclosures, the shaping process may include: hot melting at least one patterned lens body from the top at a temperature within a range of 90° C. to 110° C. for a time length within a range of 250 seconds to 350 seconds.

Then, as shown in FIG. 6E, at least one shaped lens body 207D is flattened to obtain at least one lens 2071, 2072, 2073. According to embodiments of the present disclosure, the flattening process may include: hot melting at least one shaped lens body from the top at a first temperature for a first time length; and hot melting at least one hot melted lens body from the top at a second temperature for a second time length. The first temperature is greater than the second temperature and the first time length is less than the second time length. For example, the first temperature may be within a range of 115° C. to 125° C., and the first time length may be within a range of 75 seconds to 85 seconds. For example, the second temperature may be within a range of 75° C. to 85° C., and the second time length may be within a range of 95 seconds to 105 seconds. In the flattening process, a central part of the lens body may be quickly melted through the first hot melting at a higher temperature and for a shorter time length, thereby forming the first part with a lower surface curvature as described above; and then, by reducing the temperature and continuing for a relatively long time for a second hot melting, the two sides of the lens body may be slowly melted, thereby forming the second part with a higher surface curvature as described above, so as to achieve a lens with a cross-section similar to that of a truncated ellipse shown in FIG. 6E.

According to embodiments of the present disclosure, by adjusting a hot melting process of the lens based on the exposure limit (0.6 μm to 0.8 μm) of the apparatus, the space between the lenses is further reduced to minimize the scattered light around the pixel, thereby further improving a light efficiency and increasing the brightness. In addition, a coverage range of brightness in a central region may be controlled and widened by flattening processing, which may increase a brightness viewing angle of a product while increasing the brightness of the device.

According to other embodiments of the present disclosure, a display panel including the display device as described above is further provided. The display panel is a panel that may display information such as text, images, or videos. Examples of the display panel include a liquid crystal display panel (LCD), an organic light-emitting diode display panel (OLED), a plasma display panel, etc.

Figure 7A:
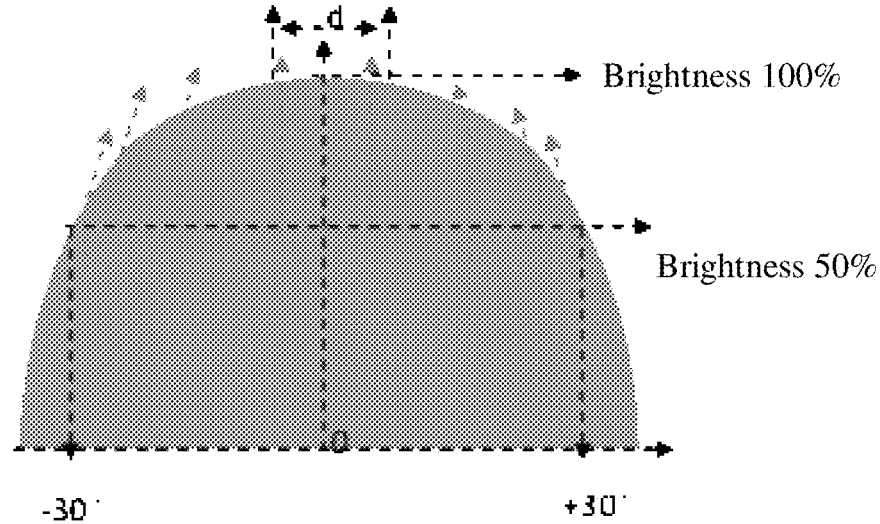
FIG. 7A shows a schematic diagram of light exiting and highest brightness region of a display panel including the display device shown in FIG. 1.
Figure 7B:
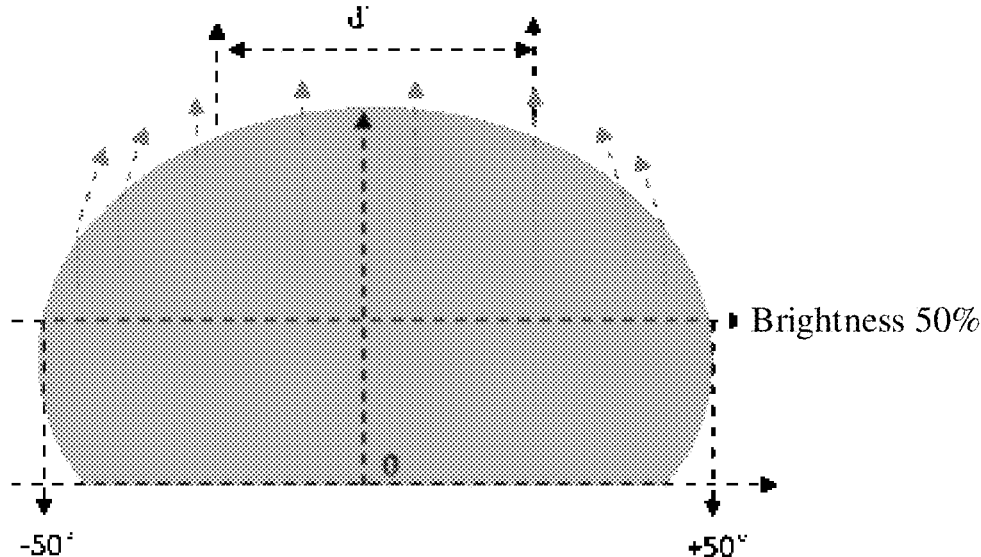
FIG. 7B shows a schematic diagram of light exiting and highest brightness region of a display panel including a display device according to embodiments of the present disclosure.

FIG. 7A shows a schematic diagram of light exiting and highest brightness region of a display panel including the display device shown in FIG. 1. FIG. 7B shows a schematic diagram of light exiting and highest brightness region of a display panel including the display device according to any of the above embodiments.

In the display panels shown in FIGS. 7A and 7B, the region of the display device is composed of several pixels and lens focusing units. The display panel is gradually viewed from the side to the front view, the observed brightness variation of the display panel may be simulated as a brightness variation of a structure similar to a lens structure. By simulating the display device as shown in FIG. 1 and the display device in the above embodiments, the results may be shown in FIGS. 7A and 7B, respectively. As shown in FIGS. 7A and 7B, the horizontal axis represents a viewing angle, and the vertical axis represents a height of the lens corresponding to the observed brightness.

As shown in FIG. 7A, the entire region around the lens up to the top of the lens has the function of converging the scattered light around the lens. As the arch height of the lens is relatively large, the range of brightness variation from different viewing angles is relatively large, and the range (d)

of the highest brightness region is relatively narrow. In the simulation process, the entire region around the lens up to the top has the function of converging scattered light around the lens, the range of brightness variation is relatively large, and the range of the highest brightness region is relatively narrow. When 50% of the highest brightness is observed, the corresponding viewing angle is about 30°.

As shown in FIG. 7B, the lens is in a flattened shape, and the region around the lens has the function of converging the scattered light around the lens. This is because the flat region of the lens is flat and the arch height of the lens is relatively low, the range of brightness variation from viewing angles is relatively small. The range of the highest brightness region is (d'), with d'>d. In the simulation process, the flat region of the lens is flattened, and the range of the highest brightness region is increased, the range of brightness variation is reduced. When 50% of the highest brightness is observed, the corresponding viewing angle is increased, for example, may reach about 50°.

The display panel may be applied to an electronic apparatus, for example. The electronic apparatus according to embodiments of the present disclosure may be an apparatus that includes a display function, that is, an apparatus that includes the display panel described above. The display panel may be applied to AR/VR display apparatuses such as helmet displays, stereoscopic displays, and eyeglass displays. The display panel may also be used in near eye apparatuses that replace optical structures with digital displays, such as electronic telescopes, electron microscopes, medical endoscopes, and other professional devices with similar near eye display requirements.

For example, the electronic apparatus may also be smartphones, mobile phones, video phones, e-book readers, desktop computers (PCs), laptops, netbooks, personal digital assistants (PDAs), portable multimedia players (PMPs), digital audio players, mobile medical apparatuses, cameras, wearable apparatuses (such as head worn apparatuses, electronic clothing, electronic wristbands, electronic necklaces, electronic accessories, electronic tattoos, or smart watches), etc.

According to embodiments of the present disclosure, the electronic apparatus may also be an intelligent household appliance that includes a display function. For example, the intelligent household appliance may be televisions, digital video disc (DVD) players, speakers, refrigerators, air conditioners, vacuum cleaners, ovens, microwaves, washing machines, dryers, air purifiers, set-top boxes, television (TV) boxes, game consoles, electronic dictionaries, electronic keys, cameras, video frames, etc.

According to embodiments of the present disclosures, the electronic apparatus may also be medical apparatuses (such as magnetic resonance angiography (MRA) apparatuses, magnetic resonance imaging (MRI) apparatuses, computed tomography (CT) apparatuses, imaging apparatuses, or ultrasound apparatuses), navigation apparatuses, global positioning system (GPS) receivers, event data recorders (EDRs), flight data recorders (FDRs), automotive information and entertainment apparatuses, navigation electronic apparatuses (such as navigation apparatuses, gyroscopes or compasses), aviation electronic apparatuses, safety apparatuses, industrial or consumer robots, ATMs, points of sale (POS), etc.

According to embodiments of the present disclosures, the electronic apparatus may also be furniture with display functions, parts of buildings/structures, electronic bulletin boards, electronic signature receiving apparatuses, projectors, various measuring apparatuses (such as water meters, electricity meters, gas meters, or electromagnetic wave measuring apparatuses), etc. According to some embodiments, the electronic apparatus may be any combination of the above apparatuses. Furthermore, the electronic apparatus according to various embodiments may be flexible apparatuses. In addition, those skilled in the art should be aware that electronic apparatuses according to various embodiments disclosed herein are not limited to the above apparatuses.

The above describes embodiments of the present disclosure. However, these embodiments are for illustrative purposes only and are not intended to limit the scope of the present disclosure. Although each embodiment has been described separately above, this does not mean that the measures in each embodiment cannot be advantageously combined. The scope of the present disclosure is limited by the attached claims and their equivalents. Without departing from the scope of the present disclosure, those skilled in the art may make various substitutions and modifications, all of which should fall within the scope of the present disclosure.

What is claimed is:

1. A display device, comprising:
a base substrate;
at least one light-emitting unit on the base substrate, wherein the light-emitting unit has a first electrode, a second electrode, and a light-emitting layer located between the first electrode and the second electrode, and the first electrode is located between the light-emitting layer and the base substrate;
an encapsulation layer covering the at least one light-emitting unit; and
at least one lens on a side of the encapsulation layer away from the base substrate, wherein the at least one lens corresponds one-to-one with the at least one light-emitting unit,
wherein the lens has a first part and a second part surrounding the first part, an outer surface of the first part has a first curvature, an outer surface of the second part has a second curvature, and the first curvature is less than the second curvature; and
wherein the display device further comprises:
a color film layer between the encapsulation layer and the at least one lens;
a first planarization layer between the encapsulation layer and the color film layer; and
a second planarization layer between the color film layer and the at least one lens.

2. The display device according to claim 1, wherein a projection of the first part of the lens on the base substrate is located within a projection of a bottom surface of the lens on the base substrate, and a projection of the second part of the lens on the base substrate is located outside the projection of the bottom surface of the lens on the base substrate.

3. The display device according to claim 1, wherein the lens has a first dimension in a direction parallel to the base substrate and a second dimension in a direction perpendicular to the base substrate, and a ratio of the first dimension to the second dimension is within a range of 1.5 to 2.

4. The display device according to claim 1, wherein a surface inclination of the first part of the lens is within a range of 25 degrees to 35 degrees, and a surface inclination of the second part of the lens is within a range of 85 degrees to 95 degrees, so that the first curvature is less than the second curvature, and
wherein the surface inclination of the first part is an angle of a surface tangent of the first part at a half height of the first part in a direction perpendicular to the base substrate relative to a first direction, the surface inclination of the second part is an angle of a surface tangent of the second part at a half height of the second part in the direction perpendicular to the base substrate relative to the first direction, and the first direction is parallel to the base substrate.

5. The display device according to claim 1, wherein at a position where the second part of the lens is in contact with the second planarization layer, an angle between the outer surface of the second part and an outer surface of the second planarization layer is within a range of 43 degrees to 47 degrees.

6. The display device according to claim 1, wherein a surface of the second planarization layer covered by the lens is higher than a surface of the second planarization layer not covered by the lens in a direction perpendicular to the base substrate and away from the base substrate, so that a bump is formed in a region in which the second planarization layer is not covered by the lens.

7. The display device according to claim 6, wherein the lens has a first projection on the base substrate, a bottom surface of the lens has a second projection on the base substrate, and a distance between an outer edge of the first projection and an outer edge of the second projection is greater than a height of the bump.

8. The display device according to claim 1, wherein the display device comprises a plurality of light-emitting units and a plurality of lenses corresponding one-to-one with the plurality of light-emitting units, and a minimum distance between adjacent lenses is less than a minimum distance between outer edges of bottom surfaces of the adjacent lenses.

9. The display device according to claim 8, wherein
the color film layer comprises a first color film, a second color film, and a third color film;
the plurality of light-emitting units comprise a first light-emitting unit located on a side of the first color film facing the base substrate, a second light-emitting unit located on a side of the second color film facing the base substrate, and a third light-emitting unit located on a side of the third color film facing the base substrate;
the plurality of lenses comprise a first lens located on a side of the first color film away from the base substrate, a second lens located on a side of the second color film away from the base substrate, and a third lens located on a side of the third color film away from the base substrate;
the first color film is formed after forming the second color film and the third color film, and the first color film is adjacent to one of the second color film and the third color film and covers a part of the one of the second color film and the third color film; and
a minimum distance between the first lens and one of the second lens and the third lens adjacent to the first lens is less than a minimum distance between adjacent second and third lenses.

10. The display device according to claim 9, wherein the minimum distance between the first lens and one of the second lens or the third lens adjacent to the first lens is within a range of 535 nm to 545 nm, and the minimum distance between adjacent second and third lenses is within a range of 545 nm to 555 nm.

11. The display device according to claim 9,
wherein the first color film is adjacent to the second color film and covers a part of the second color film, and the third color film is adjacent to the second color film and covers a part of the second color film; and
wherein a thickness of a first overlapping part in a direction perpendicular to the base substrate is greater than a thickness of a second overlapping part in the direction perpendicular to the base substrate, the first overlapping part is a part of the first color film that covers the second color film, and the second overlapping part is a part of the third color film that covers the second color film.

12. The display device according to claim 11,
wherein each lens of the at least one lens has a first projection on the base substrate, and a bottom surface of each lens has a second projection on the base substrate; and
wherein a distance between an outer edge of the first projection and an outer edge of the second projection of each lens is less than the thickness of the first overlapping part of the first color film in the direction perpendicular to the base substrate.

13. The display device according to claim 12, wherein the distance between outer edges of the first projection and the second projection of the first lens is greater than the distance between outer edges of the first projection and the second projection of each of the second lens and the third lens.

14. The display device according to claim 12, wherein a surface inclination of the first part of the first lens is less than a surface inclination of the first part of one of the second lens or the third lens, and the surface inclination of the first part is an angle of a surface tangent of the first part at a half height of the first part in a direction perpendicular to the base substrate relative to a first direction.

15. The display device according to claim 11, wherein a first bump is formed in a region of the second planarization layer between the first lens and the second lens and not covered by the first lens and the second lens, a second bump is formed in a region of the second planarization layer between the second lens and the third lens and not covered by the second lens and the third lens, and the first bump is higher than the second bump in the direction perpendicular to the base substrate and away from the base substrate.

16. The display device according to claim 15, wherein a curvature of the first bump is greater than the first curvature and less than the second curvature.

17. The display device according to claim 15, wherein a curvature of the first bump is greater than a curvature of a surface of the first overlapping part on a side of the first overlapping part away from the base substrate; and
wherein a curvature of the second bump is less than a curvature of a surface of the second overlapping part on a side of the second overlapping part away from the base substrate.

18. The display device according to claim 8, wherein the first color film is a green color film; one of the second color film or the third color film is a red color film, and the other of the second color film or the third color film is a blue color film; and
wherein the display device further comprises a pixel defining layer between the base substrate and the light-emitting layer, wherein the pixel defining layer covers an edge of an anode of each of the at least one light-emitting unit.

19. A display panel comprising a plurality of display devices, wherein the display device is the display device according to claim 1.

* * * * *